United States Patent [19]

Springs et al.

[11] Patent Number: 5,079,898
[45] Date of Patent: Jan. 14, 1992

[54] DEVICE AND METHOD FOR WRAPPING BALES OF HAY OR THE LIKE WITH PROTECTIVE MATERIAL PRIOR TO EJECTION FROM A BALER

[75] Inventors: Daniel R. Springs, Martindale; Jesse Hinojosa, San Marcos, both of Tex.

[73] Assignee: Indeco Products, Inc., San Marcos, Tex.

[21] Appl. No.: 280,326

[22] Filed: Dec. 6, 1988

[51] Int. Cl.⁵ .............................................. B65B 11/04
[52] U.S. Cl. ................................. 53/399; 53/587; 53/389.3
[58] Field of Search ............... 53/118, 116, 211, 215, 53/389, 399, 430, 587, 389.3, 389.2; 100/5, 87, 88, 89

[56] References Cited

U.S. PATENT DOCUMENTS

| | | | |
|---|---|---|---|
| 3,863,425 | 2/1975 | Ewards et al. | 53/211 |
| 4,173,108 | 11/1979 | Eglinton et al. | 53/211 X |
| 4,173,112 | 11/1979 | Meiners | 53/118 |
| 4,296,596 | 10/1981 | Meiners | 56/341 |
| 4,366,665 | 1/1983 | Vanginhoven | 56/341 |
| 4,407,113 | 10/1983 | Core | 53/587 X |
| 4,409,784 | 10/1983 | Vanginhoven | 53/430 X |
| 4,432,185 | 2/1984 | Geisinger | 53/587 X |
| 4,565,051 | 1/1986 | Back | 53/211 X |
| 4,580,398 | 4/1986 | Bruer | 53/341 |
| 4,599,854 | 7/1986 | Clostermeyer | 60/398 |
| 4,656,812 | 4/1987 | Busse | 53/118 |
| 4,697,402 | 10/1987 | Anstey et al. | 53/587 X |
| 4,716,709 | 1/1988 | Lamb, Sr. et al. | 53/389 X |
| 4,718,219 | 1/1988 | Schmitz | 53/587 X |
| 4,729,213 | 3/1988 | Raes | 53/118 X |
| 4,736,567 | 4/1988 | Pienta | 53/587 X |
| 4,748,793 | 7/1988 | Brookman | 53/389 X |
| 4,754,594 | 7/1988 | Lancaster | 53/399 |
| 4,768,431 | 9/1988 | Merritt | 100/88 |
| 4,807,427 | 2/1989 | Casteel et al. | 53/587 X |
| 4,827,700 | 5/1989 | Rampe et al. | 53/211 X |
| 4,890,443 | 1/1990 | Diehm | 53/399 X |

FOREIGN PATENT DOCUMENTS

| | | |
|---|---|---|
| 852018431 | 3/1987 | European Pat. Off. |
| 2705101A | 8/1978 | Fed. Rep. of Germany |
| 3301420A1 | 7/1984 | Fed. Rep. of Germany |
| 2146288A | 4/1985 | United Kingdom |
| 2152872A | 8/1985 | United Kingdom |

OTHER PUBLICATIONS

Parsamerica Associates; Rondotex MX 1000; Polydress.
Haywrap, Inc.; Hay Wrap; Jul. 1988.
Unverferth Manufacturing Co., Inc.; Round-About ™.
Vermeer Manufacturing Company; Bale Wrapper.
M&W Gear; Round Bailing System.
M&W; Hayfly Tedder-Windrower.

Primary Examiner—John Sipos
Attorney, Agent, or Firm—Pravel, Gambrell, Hewitt, Kimball & Krieger

[57] ABSTRACT

An apparatus and method for wrapping a bale of agricultural product with protective material prior to ejection from a baler wherein the apparatus is attachable to most commercial balers, the material can both protect and bind the bale, material of a width less than the width of the bale can be used, and the bale can be wrapped with a spiral wrap of material at both its nominal width and in a gathered narrow rope-like width.

43 Claims, 5 Drawing Sheets

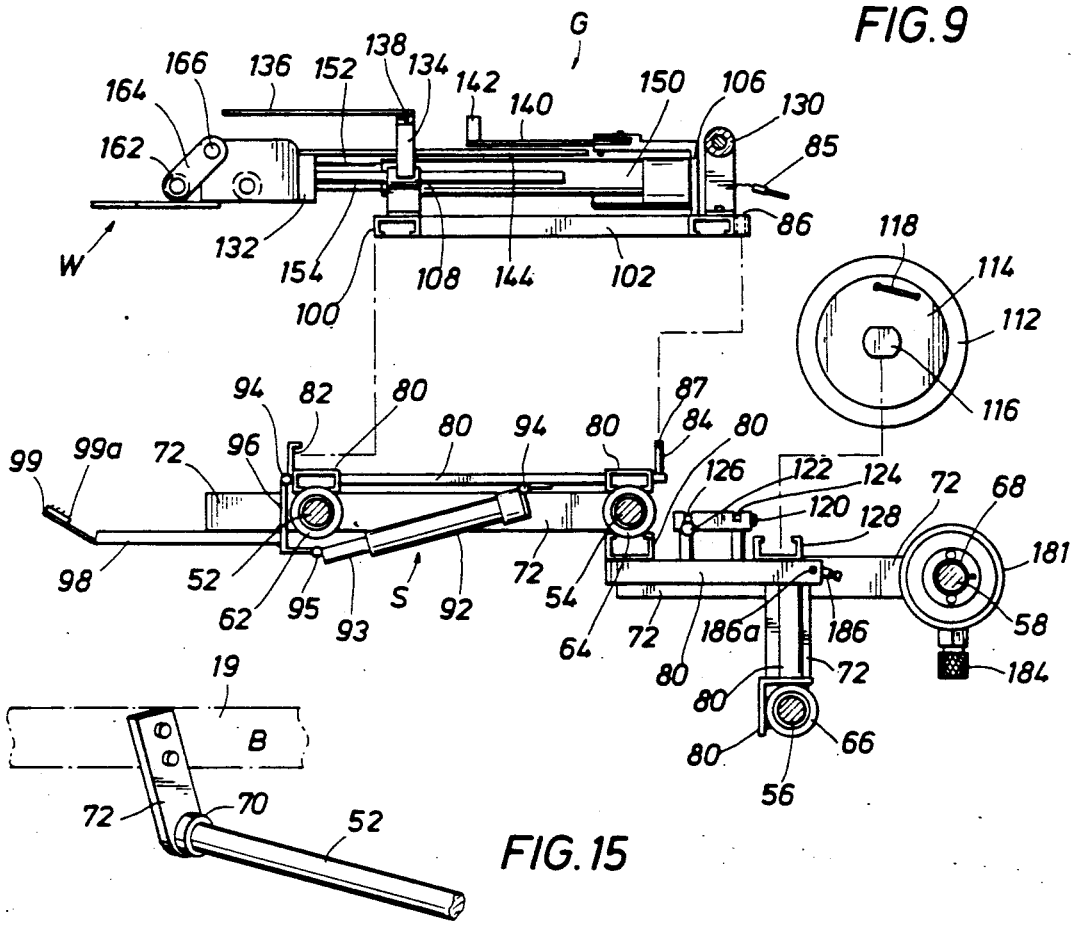
FIG. 9
FIG. 15
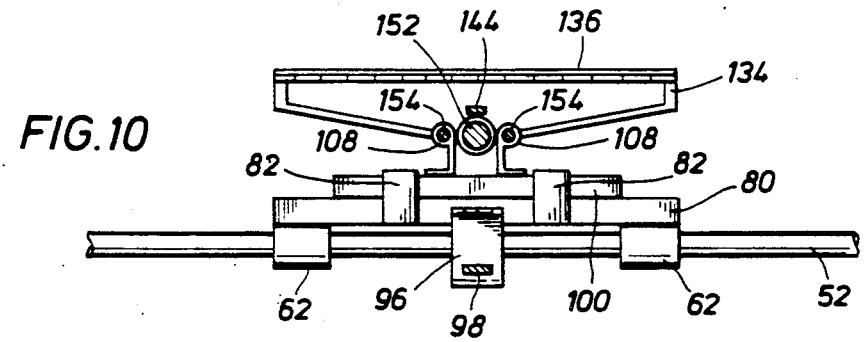
FIG. 10
FIG. 11

5,079,898

DEVICE AND METHOD FOR WRAPPING BALES OF HAY OR THE LIKE WITH PROTECTIVE MATERIAL PRIOR TO EJECTION FROM A BALER

BACKGROUND OF THE INVENTION

1. Field of the Invention

The field of this invention is apparatus and method for wrapping a bale of hay or the like with protective material prior to ejection from a baler.

2. Description of the Prior Art

Bales of agricultural product are frequently stored outside. They are, therefore, subjected to wind and rain from the time of baling until the time when the bales are used. This weathering can result in the deterioration of the quality of the product, especially around the outside and bottom of the bale. This decrease in quality may prevent hay, for instance, from being consumed by cattle or render it nutritionally useless if it is consumed.

This invention is particularly applicable to round hay bales. The use of the term "hay or the like" can refer to any crop material, however.

Hay is the most common source of stored feed used in beef cattle operations. Harvested at the proper stage of plant growth and undamaged by weather, hay provides nutrients at a lower cost than any other form of feed with the exception of pasture or silage. In recent years large round baling has mechanized hay harvesting, thereby lowering labor requirements for hay hauling and hay feeding in comparison with the requirements for conventional square bale haying. A recent research study found that round baling reduced the harvesting, transporting, and handing labor for hay by one-half of that required for rectangular bales.

Research has shown that a firm round bale of hay stored one year outside will lose 22% dry matter. The same bale stored for two years will lose 25% dry matter. This means that a round bale of hay stored outside for two years will only have 75% of its original weight remaining for feeding. The main loss that occurs to a round bale is on the outer portion of the bale. Other studies have shown that round hay bales wrapped with plastic wrap with the ends exposed can maintain hay quality equal to hay stored in barns, with only 5.5% to 13.4% weathering. An efficient and practical means for applying weather-proofing to crop material bales, therefore, has significant nutritional and economic values.

Effective baling of any agricultural crop material usually requires binding the bale to protect and preserve the bale's integrity. Compressing the bale may also be of protective and preservative value. It is an object of the present invention to provide not only an improved, efficient and practical means for wrapping a bale of crop material such that the bale is protected from the elements but also a means to bind and compress the bale. It is possible for the application of protective wrap to serve at the same time three "protective" functions, that of covering from the elements, of binding and of compressing. Furthermore it is not necessary that "protective" wrap consist of solid sheeting. A perforated or net material may effectively preserve baled crop materials in the field from deterioration from the elements as well as offer binding and compressing characteristics.

An improved efficient and practical means for applying protective wrap to bales of crop material should offer several further advantageous features An improved wrapping apparatus should be installable on most commercial balers. Therefore, the mechanism should work independently of the particular means used to form the bale in the baler, such as horizontal rollers or vertical belts. The protective wrap used in an improved wrapping apparatus should serve all three functions of covering, binding and compressing Furthermore, an improved wrapping apparatus should be operable with wrap that has an adhering quality in order to simplify the problem of attaching the initial free end of the wrap to the bale and the problem of securing the tail end of the wrap to the bale. As other features, an improved hay wrapping apparatus should provide for the easy replacement of rolls of protective wrap and should be completely remotely controllable. The capacity to work with short rolls of film, rolls that are shorter than the bale, is an advantage. Short rolls are easier to handle, and short rolls of standard length should be less expensive than rolls manufactured to special lengths.

The present invention, in distinction to the prior art, offers all of the above features. The present invention can feed the wrap through the crop intake opening into the bale chamber, a throat that exists on most commercial balers. Thus, the invention works independently of a particular baler's means of forming and compressing the bale in the bale chamber and is installable on most commercial balers. The dispensing system of the invention does not depend upon a gravity feed or leave portions of the wrap free to be blown by the wind. Thus, the present invention works well with an adhering wrap, such as plastic stretch film, that offers superior binding and compressing as well as adhering characteristics. The present invention offers the feature of traversing. Thus, the invention can work with short easily purchased and handled rolls of protective wrap. The present invention offers the feature of roping, which is a sequentially gathering in and spreading out the wrap, laterally, as it is applied to the bale. Roping permits a superior feed of the wrap initially, a superior severing of the wrap at the finish and superior binding qualities.

To offer the above features, the present invention teaches a novel feeding means, a novel traversing means and the concept of roping, all remotely controllable and operable with an adhering wrap, such as plastic stretch film or stretch net. These novel means for wrapping a bale depart from the teachings of the prior art as found in patents to Merritt U.S. Pat. No. 4,768,431; Raes U.S. Pat. No. 4,729,213; Busse U.S. Pat. No. 4,656,812; Clostermeyer U.S. Pat. No. 4,599,844 and U.K. No. 2,152,872A; Bruer U.S. Pat. No. 4,580,398; VanGinhoven U.S. Pat. Nos. 4,409,784 and 4,366,665; Meiners U.S. Pat. Nos. 4,296,596 and 4,173,112; Biller, West German Disclosure No. DE 3301 420 A 1; and Schulz, West German Disclosure No. DE 27 05 101 A 1.

In the feeding mechanisms taught by the prior art, above, the wrap is either (1) dropped by gravity into the throat chamber of the baler where the incoming crop material is being moved to the bale forming chamber, the wrap being caught up and moved along with the crop material into the bale forming chamber and incorporated into the outer layer of the bale being formed; or (2) the wrap is dropped by gravity into the pickup conveyor fingers of the baler and by those fingers is moved to a portion of a rotating roller or belt of the bale forming chamber which catches and rolls the wrap into the outside of a formed bale; or (3) the wrap is dropped by gravity directly onto the bale or a roller or belt that forms a part of the bale forming chamber, the roller or belt picking up the wrap and carrying it into and onto the circumference of the forming or formed bale. Each of these means of initially fixing the end of the wrap to the bale depends upon gravity and either fresh cut material being fed into the baler and/or a particular belt or roller of the bale chamber. In fact, these wrap feeding mechanisms of the prior art mirror the teachings of the feeding mechanisms of the twine binding systems in the prior art.

Applicant's feed mechanism, contrary to the prior art, depends neither on gravity nor upon fresh cut material being fed into the bale chamber nor on the assistance of any particular belt or roller or pickup fingers on the baler itself. Applicant's feed mechanism, because it hand delivers the wrap to the bale, so to speak, is not easily disturbed by wind. Applicant's feed method and apparatus, therefore, is applicable to a variety of commercial balers, whatever the belt or roller arrangement of the bale forming chamber may be, and will operate in wind and when there is no further crop material to be picked up. In fact, Applicant's feed mechanism works well with adhering wraps that are easily disturbed by wind. Applicant's feed mechanism is further enhanced by the ability to feed the wrap in a gathered, or roped, state.

Biller, above, offers one deviation from the feeding mechanisms predominantly taught in the prior art. For purposes other than protection from the elements or binding or compressing, Biller teaches affixing a cloth to a rolled bale compacted in a baler. Biller feeds the cloth to the bale not by a free end but, in essence, by an intermediate section of the cloth. The intermediate section of the cloth, fixed at both ends, is fed to the bale by folding the cloth over a rod and passing the rod, widthwise, through a space between two compacting rollers of a bale chamber. This complicated scheme requires precise timing such that just before the moment of contact between the cloth and the rotating bale, one end of the cloth is released so that it becomes free and can be drawn into the rotating bale. Applicant's feeding mechanism, to the contrary, is far simpler than Biller's. Applicant works with the free end of the wrap that is (usually) left from a prior severing. Applicant's mechanism depends on a biased element holding a portion of a free end of the wrap against a feed element. The feed element delivers the wrap directly to the rotating bale. Pull, caused by the wrap's adherence to the rotating bale, overcomes the force of the bias element and pulls the wrap free from the feed element. As a result of this means of attachment, Applicant's feeding mechanism can be started and stopped at any time in the feeding cycle without hindrance to the feeding process, and Applicant's scheme works well with adhering wrap. Such does not appear possible with Biller's complicated scheme. Biller's scheme presumes that the end of the cloth, once freed, wi progress smoothly, without catching, between two oppositely turning rollers and immediately affix itself to the rotating bale. Were the feeding process interrupted after the ends were freed but before attached, it is not at all clear that Biller's apparatus could continue to function.

Among the prior art cited above, only the disclosed patent application of Schulz, together with a the Haywrap machine and a UM hay wrapping tool, both as commercially advertised, teaches wrapping a bale with wrap of a width substantially less than the width of the bale, so that covering the bale is by traversing the wrap sideways as the bale is turned. The Haywrap machine and UM hay wrapping tool both deal only with formed bales already lying in the field. They require equipment that includes the capacity to spear, lift and rotate a bale. It is unclear to what extent the Haywrap machine and the UM universal hay tool are remotely controllable. There is no teaching that either the machine nor the tool could be mounted on a commercial baler. Schulz teaches a hay wrapping mechanism mounted in the forward compartment of a baler that feeds wrap to a formed bale through the crop material throat and that uses a roll of wrap whose width is less than the width of the bale. The roll of wrap traverses the width of the bale as the bale is turned in the bale chamber. Schulz does not clearly teach, however, traversing the bale in both directions. It is unclear to what extent Sohulz's method and apparatus is remotely controllable. Furthermore, Schulz does not teach a manner of traversing that requires no independent power, control or coordination but rather is controlled strictly by the pull of the wrap into the bale.

SUMMARY OF THE INVENTION

This invention claims a new and improved apparatus and method for wrapping bales of agricultural products, such hay or the like. The bales are wrapped with protective material that can cover, compress and bind. The apparatus adapts to mount on most commercial balers, including the well-known conventional round hay balers. Operation of the apparatus is remotely controllable by the driver from the cab of the tractor pulling the baler.

The present invention teaches wrapping bales of hay and the like with protective material subsequent to the bale's formation and prior to the bale's ejection from the baler. The bales are wrapped while they rotate in the bale forming chamber. The particular apparatus of this invention and its method of deployment enables the wrap to serve multiple protective functions, such as covering, binding and compressing. Stretch plastic film is one material that can be applied.

More specifically, the apparatus involves a system for contacting and attaching an end of protective material to a formed bale within a baler. Material is dispensed to wrap the bale as the bale rotates within the baler. A mechanism is provided for severing the material subsequent to the wrapping and prior to ejection of the bale.

A preferred means for initially contacting and attaching an end of the material to the bale involves engaging an end of material with a feed element. At the time of the initiation of the wrapping, the feed element with the material end is thrust through the crop intake opening of the bale forming chamber and against a formed bale. The protective material selected as wrap, such as plastic stretch film, for this preferred attaching means will have sufficient adhering qualities that rotation of the bale causes the material to stick to the surface of the bale, and the wrap is pulled around the exterior of the bale to at least partially cover the same.

The apparatus and method of the present invention is adapted to wrap a bale of hay or the like with a roll of material that is shorter, or less wide, than the bale. In this case the dispensing system includes a traversing means so that the pulling of the material, entailed by the bale's rotation, causes the material roll and the dispensing system to traverse the bale's width. In a preferred embodiment the traversing is accomplished by mounting the apparatus on the baler upon a plurality of shafts.

The shafts are aligned approximately parallel to the axis of rotation of the bale. The material roll, the attaching apparatus, the dispensing apparatus and the severing apparatus all traverse the baler laterally, from side to side, upon fixed shafts as the material is pulled around the bale.

In a further preferred embodiment of the apparatus the means for dispensing protective material includes means for gathering the width of the wrap dispensed into a narrow rope-like configuration. When the dispensing apparatus includes means for gathering the width of the wrap, the dispensing means of the apparatus itself is preferably designed so that it otherwise tends to dispense material at the nominal width of the material roll. Thus, material may be dispensed to the bale alternately at the material's nominal width and in a rope-like strand.

In the embodiment of the invention that contains the means for gathering the width of the wrap, a preferred method for practicing the invention includes gathering the wrap into a narrow strand both when the material is attached to the bale and when the material is severed. In this embodiment the severing means is comprised of a plurality of teeth, well-designed to sever a narrow rope-like strand.

It is preferred that the severing means cooperate with the attaching means of the invention so that after the material is severed, the end of the material from the roll becomes engaged with the feeding element. Hence, the end of the wrap is automatically in a position to be attached to the next bale.

One preferred embodiment of the invention includes both the capacity to wrap the bale with material from a roll that is of less width than the bale, using the traversing means, and the capacity to vary the width of the material that is dispensed to the bale. The combination of the above two features enables the invention to be practiced in a novel and advantageous manner. The method of practicing the present invention in this novel manner involves, first, gathering an end of the material and attaching it to the bale. Beginning with a gathered end facilitates the attachment process. Next, the bale is spirally wrapped with material at its nominal width utilizing the traversing means. Subsequently the material is gathered into a narrow configuration and the bale is wrapped spirally with a rope-like strand This second wrapping enhances the binding effect of the wrap. The material is then severed while it is gathered into a narrow configuration. It can be seen that wrapping the bale spirally, both with material at its nominal width and with material gathered into a rope-like strand, enhances the binding, compressing and covering features of the wrap.

BRIEF DESCRIPTION OF THE DRAWINGS

FIG. 9 is a side exploded view of a preferred embodiment of the present invention, the exploded view illustrating the relationship between the lower frame, the upper film guidance system frame and the film roll system.

FIG. 10 is a cutaway view of the apparatus of FIG. 4 taken on line 10—10 of FIG. 4.

FIG. 11 is a view of the expanding and retracting portion of the film guidance system and the feed system, taken on line 11—11 of FIG. 4.

FIG. 15 is an alternate view of means for mounting the apparatus upon a baler.

DETAILED DESCRIPTION OF PREFERRED EMBODIMENTS

The Apparatus and the Baler Relationship

Figure 1:
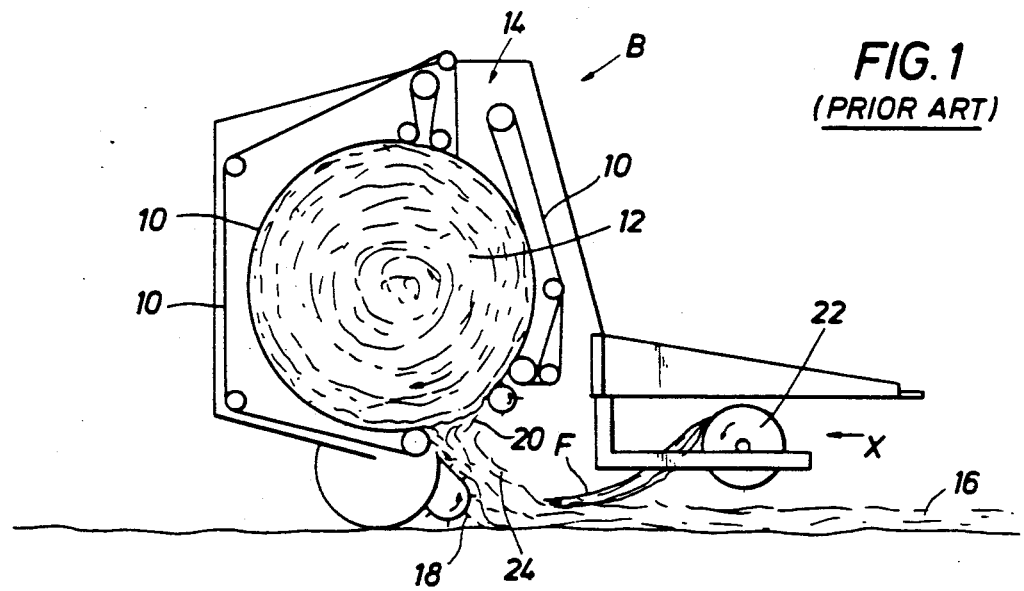
FIG. 1 is an illustrative view of one style of a commercial round hay baler with a prior art wrapping device attached.
Figure 2:
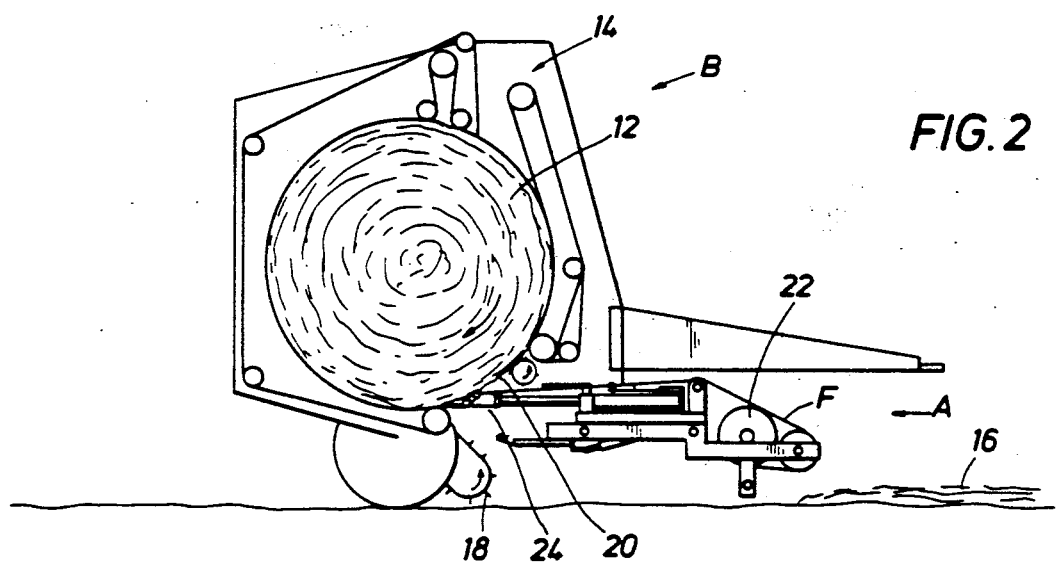
FIG. 2 is an illustrative view of the same commercial baler, above, with the wrapping apparatus of the present invention attached, although not to exact scale.
Figure 3:
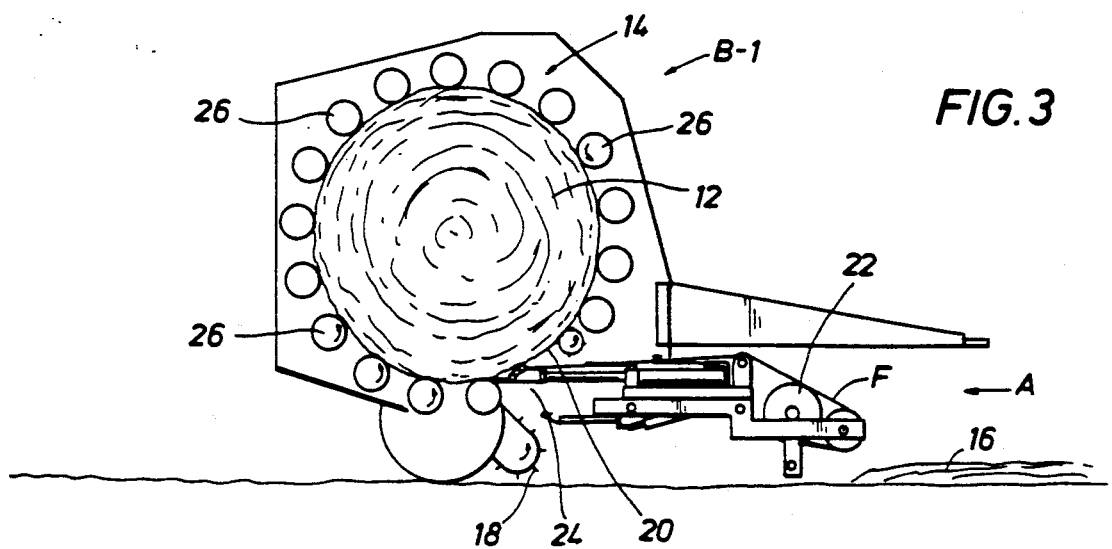
FIG. 3 is an illustrative view of a different style of commercial baler than that above, with the wrapping apparatus of the present invention attached, although not to exact scale.

FIGS. 1, 2, and 3 are illustrative only of round hay balers. The wrapping apparatuses shown attached to the balers are not shown in scale. For clarity of viewing, the wrapping apparatus is shown in approximately twice the scale of the baler. In reality, the material roll 22 of apparatus A would be located in the forward portion of the baler approximately where the tongue joins the body.

FIGS. 1 and 2 illustrate one well-known type of a commercial round hay baler B. The wrapping apparatus X of FIG. 1 attached to baler B represents a prior art system. The wrapping apparatus A of FIG. 2 attached to baler B represents the present invention.

The baler B of FIGS. 1 and 2 operates in the following manner. The baler is pulled by a tractor, not shown, in the forward direction which is to the right in the drawings. As the baler moves forward, hay or other similar crop material 16, lying on the ground, is picked up by pick-up fingers 18 which are rotating counterclockwise toward the crop material and upwards into the baler throat 24. The loose crop material is conveyed to the crop intake opening 20 of the bale forming chamber 14 at which point it is incorporated into the rotating forming bale 12. A series of belts 10 within the bale forming chamber compress and rotate the bale and expand with the bale as it forms into an ever larger cylinder. The baler receives its power in a known manner from the power takeoff of the tractor (not shown). Not shown in FIGS. 1 and 2 is a well-known hinging mechanism located on the top of the baler. By means of the hinges and a power system the rearward half of the bale forming chamber is pivoted upwardly to provide an opening through which a fully formed bale is ejected

Contrast of Prior Art and Present Invention in Manner of Attaching Wrap

FIG. 1 illustrates one prior art system X for attaching a film F to a bale. Film or material F from material roll 22 is dropped onto cut crop material that is being picked up by the pick up fingers. The wrapping material is conveyed through the baler throat to the crop intake opening of the bale forming chamber together with the fresh crop. The crop and the wrap are incorporated together into the outer layer of the bale.

In contrast to this prior art system illustrated in FIG. 1, FIG. 2 illustrates an embodiment of the present invention A for attaching protective wrap to a bale. This embodiment carries the wrap directly to a fully formed bale. Because the wrap, engaged with a feed element, is carried to the bale this attaching system tends to be impervious to any distorting effects of wind, and the wrap is not liable to become tangled in the pick-up fingers. Further, with the present invention, it is not necessary that fresh crop material continue to be picked up when the end of the protective wrap is attached to the bale. The baler may be stopped in its progress down a window, and can even be backed up, as suggested by FIG. 2, when the attachment process takes place.

An Alternative Round Hay Baler Design with Present Invention

FIG. 3 illustrates that an embodiment of the present invention A can operate with a variety of styles of commercial "round" hay balers. The term "round" as used herein refers to a substantially cylindrically shaped bale. The commercial baler B-1, illustrated in FIG. 3, forms a bale by a well-known means using a series of horizontal rollers 26 that rotate the bale within the bale forming chamber 14 while compressing and forming the bale and expanding with the bale. Since the present invention A does not depend upon or utilize a particular roller or belt of the baler, the invention can be installed not only upon baler B and B-1 but upon most commercial balers. As with the first style of baler B, illustrated in FIG. 2, this second style of baler B-1 has a crop intake opening 20 in the bale forming chamber 14 through which the present invention A can attach and dispense protective wrap.

Mounting Means

As illustrated in FIGS. 2 and 3 above, the apparatus of the present invention A is adapted to be mounted in the forward sections of most commercial balers. The mounting means can be more particularly discerned from FIGS. 4, 5, 7, 8, 9, 10 and 15.

Figure 4:
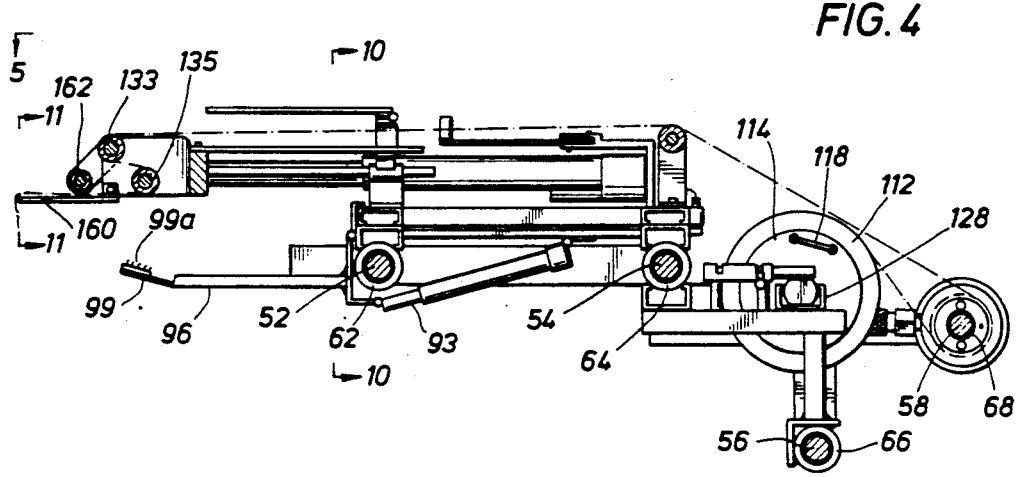
FIG. 4 is a side view of one embodiment of the present invention taken on line 4—4 of FIG. 5, showing the movable portion of the upper film guidance system extended.
Figure 7:
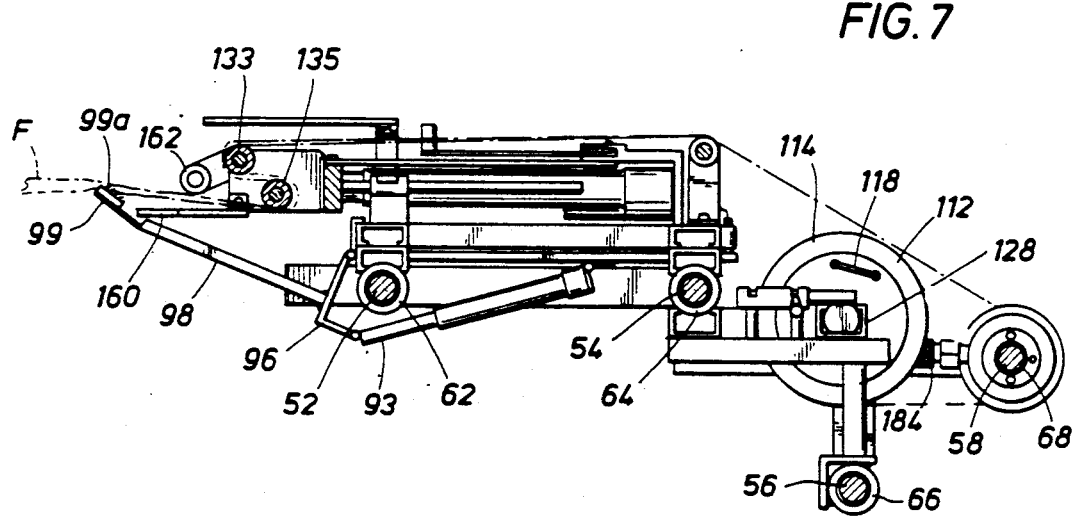
FIG. 7 is a side view of the embodiment of FIG. 8 taken on line 7—7 of FIG. 8, showing the movable portion of the upper film guidance system retracted and, in addition, in the severing stage.

The frame for the apparatus, including the material roll, the attaching system, the dispensing system and the severing system, but excluding the payout roller, is mounted upon linear motion bearings 62, 64 and 66 that encircle a plurality of shafts 52, 54 and 56. FIGS. 4, 5, 7 and 8 illustrate shafts 52, 54, and 56. FIGS. 4 and 7 illustrate linear motion bearings 62, 64 and 66 from a side view. FIG. 10 further illustrates with a front view bearings 62 as they encircle shaft 52. The linear motion bearings permit the frame riding upon the bearings to traverse the shafts that the bearings encircle.

Figure 6:
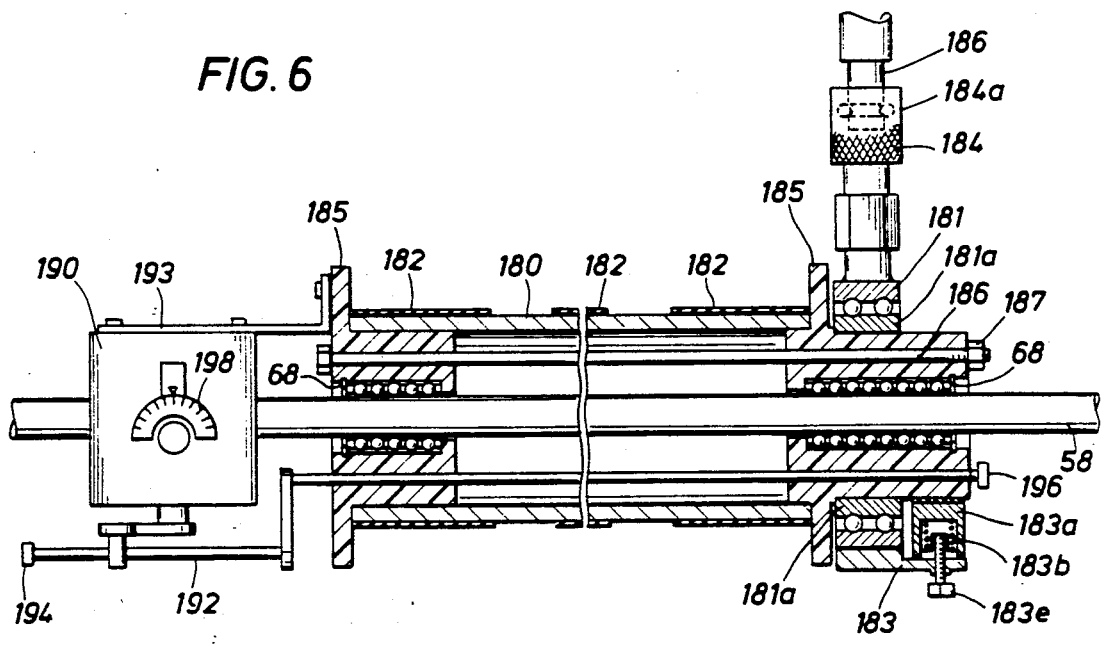
FIG. 6 is a plan view of the payout roller with portions of the payout roller cut away to show its mounting.

Payout roller 180, part of the dispensing system, is mounted separately from the frame above, although the roller connects thereto. The connecting mechanism will be described more fully below. As illustrated in FIG. 6, payout roller 180 is mounted upon shaft 58 by means of bearings 68. Bearings 68 are multidirectional bearings. They permit payout roller 180 not only to traverse shaft 58 but also, simultaneously, to rotate around shaft 58. Bearings 68 are set inside flanges 185 which, by means of bolt 186 and nut 187, secure payout roller 180 upon shaft 58 such that the roller can traverse and rotate upon the shaft.

Figure 5:
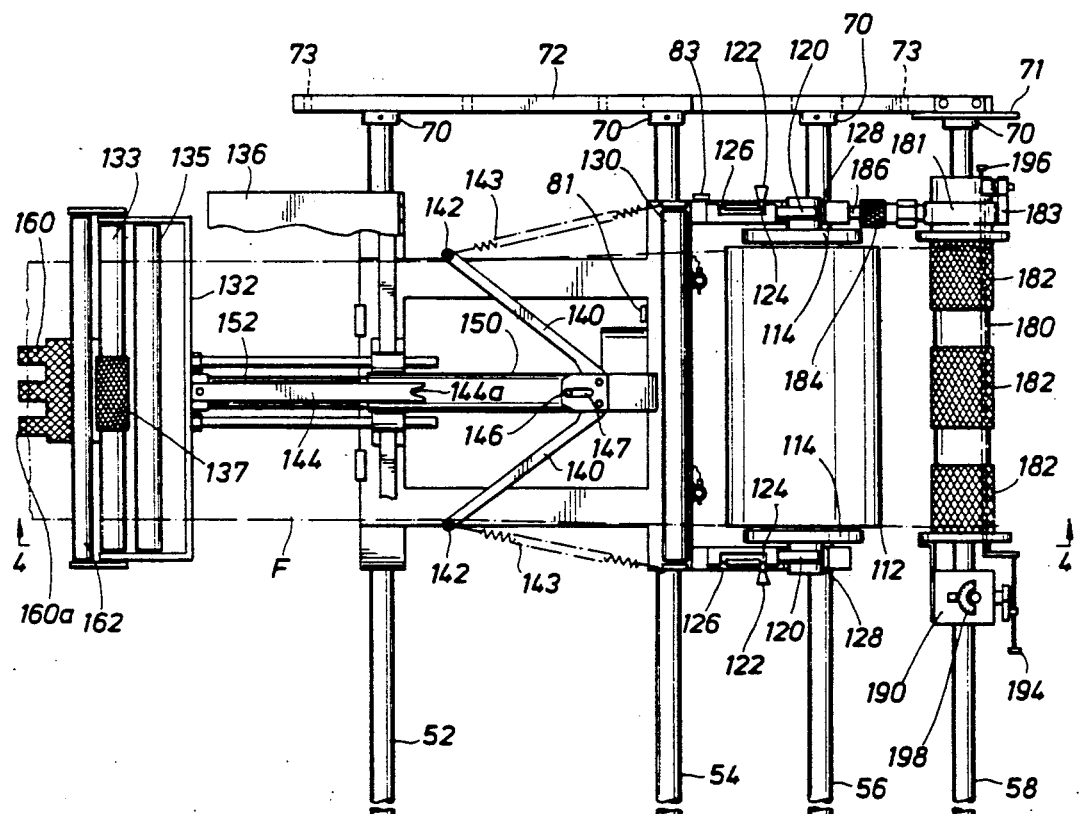
FIG. 5 is a plan view of the preferred embodiment of FIG. 4, taken on line 5—5 of FIG. 4, and showing the film dispensed at its nominal width.
Figure 8:
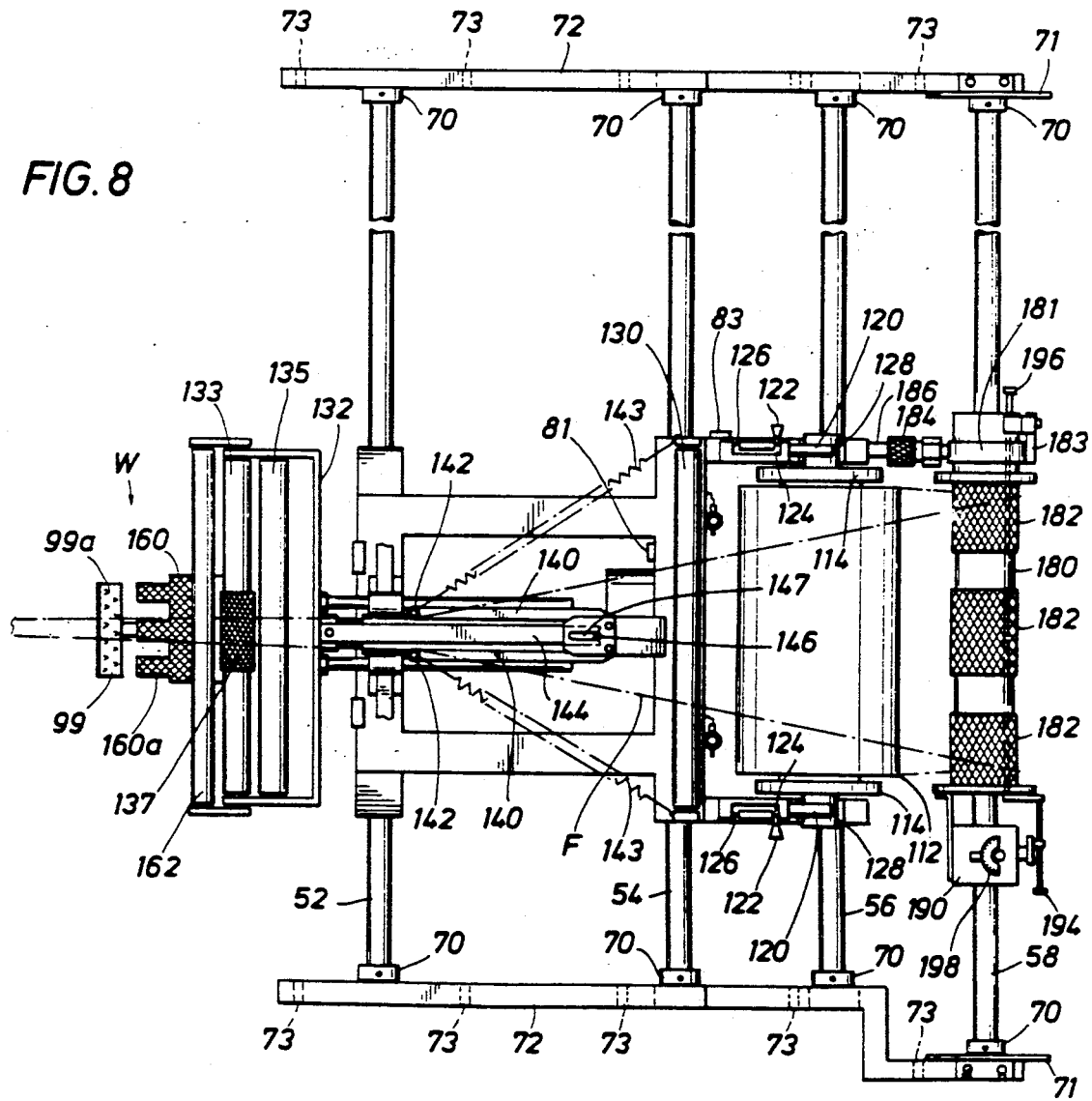
FIG. 8 is a plan view of the embodiment of FIG. 7 taken on line 8—8 of FIG. 7, showing, in addition, the wrapping material gathered.

As illustrated best in FIGS. 5, 8 and 15, the mounting shafts in turn are affixed at each end by sleeves 70 to mounting brackets 72. A slight adjustment of the shafts within sleeves 70 may be permitted in order to aid in the alignment of the shafts so that they can be installed approximately parallel to the axis of rotation of the bale. The shape of mounting brackets 72, and the length of the shafts, depend upon the particular commercial baler to which the apparatus is to be attached. FIG. 15 illustrates an alternate mounting system for shaft 52. Mounting bracket 72 is shown bolted into the side wall 19 of baler B. Generally, mounting brackets 72 are attached securely to the forward portion of the side walls 19 of the commercial baler by bolts. Bolt holes 73 are shown in FIGS. 5 and 8 for connecting brackets 72 to the baler. Some portion of mounting brackets 72 may extend forwardly and outwardly from the baler walls.

Lower Frame

As best illustrated in FIG. 9, the preferred embodiment of the apparatus of the present invention consists of a lower frame 80 to which the severing system S is pivotally attached and to which the protective material roll and mandrel 110 and the upper film guidance system G are removably attached. In FIG. 9 shafts 52, 54 and 56, treated above, are shown encompassed by linear motion bearings 62, 64 and 66. Lower frame 80 is affixed to the linear motion bearings 62, 64 and 66. Note in FIG. 9 that mounting bracket 72, which serves to affix the set of shafts to the side walls of the baler, is shown in the background and is not to be confused with the lower frame elements.

Protective Material Roll and Mandrel System

The means for attaching the roll of protective material and mandrel 110 to underframe 80 is illustrated in FIGS. 5, 7, 8 and 9. In an exploded portion of FIG. 9, roll of material 112 is shown abutting flange 114. Mandrel 116 with flattened portions is shown inserted through the roll and flange. As can be seen from FIGS. 5 and 8, there is a corresponding flange 114 on the mandrel on the other side of the roll. One flange 114 is fixed to the mandrel and is removable. Handle 118 (FIGS. 4, 7 and 9) is attached to flange 114 to permit the easy handling of the material roll and mandrel system 110. To attach the material roll system 110 to underframe 80, mandrel 116 is inserted into brackets 128 (FIG. 9) attached to underframe 80. Although FIGS. 4, 7 and 9 show only one bracket 128 on one side of the apparatus, it can be seen from FIGS. 5 and 8 that brackets 128 exist on both sides of underframe 80. After inserting mandrel 116 into brackets 128, knobs 122 are moved from notches 126 to notches 124, thereby moving bars 120 over the top of mandrel 116 and securing mandrel 116 into bracket 128 (FIG. 4).

Severing System

The severing system S, as indicated by an exploded portion of FIG. 9, is attached to lower frame 80 in the following manner. Severing system linear actuator 92 is pivotally attached to lower frame 80 at hinge 94. Pivoting element 96 is attached by hinges to linear actuator arm 93 at point 95 and to lower frame 80 at hinge 97. Cutter arm 98 is rigidly attached to pivoting element 96. Plate 99 with projecting teeth is attached to the end of cutter arm 98. When the linear actuator is actuated, arm 93 of the linear actuator extends, swinging element 96 upwardly and to the left (as viewed in FIGS. 4 and 9), thereby swinging the plurality of teeth 99a in the cutting plate 99 upwardly and towards the bale as best seen in FIG. 7. In this manner, as illustrated in FIG. 7, the cutting teeth 99a intersect and sever material F just above feed fingers 160a. The cutter teeth 99a are preferably a series of spaced pointed triangular shaped teeth which puncture the film F enough so that pulling on the film F severs it at the area of the teeth 99a, while leaving the film F attached to the teeth 99a for later transfer to the feed element 160. When linear actuator arm 93 retracts, the severed end of film F becomes engaged by feed fingers 160a as plate 99 lowers to its retracted position, shown in FIG. 4.

Upper Film Guidance System Frame

The upper film guidance system G is attached to lower frame 80 by inserting a portion 100 of the upper frame 102 into brackets 82 on lower frame 80, as indicated by an exploded portion of FIG. 9. Bore 86 in upper frame 102 is slipped over post 84 attached to lower frame 80, again as indicated by an exploded portion of FIG. 9. FIG. 10 further illustrates the relationship between lower frame 80, lower frame brackets 82 and upper frame portion 100. Quick release toggle pins 85, shown in FIG. 9, are pushed through holes 87 in the top portion of posts 84 to quickly secure the upper frame to the lower frame.

Upper Film Guidance System—Attaching System and Feed Fingers

The attaching system and feed elements of the guidance system G are affixed to upper frame 102 as illustrated in FIGS. 5, 8 and 9. The dispensing linear actuator 150 (FIG. 9) is attached to upper frame extension 106. Upon actuation, piston arm 152 of the cylinder of electric linear actuator 150 extends (to the left in the drawing) toward the bale, extending toward the bale moveable frame portion 132 to which is attached the wrap feeding means W as well as portions of the film dispensing means. Guide rods 154, attached to the moveable frame, slide through guides 108 of upper frame 102, lending stability and support to the movement of frame portion 132, as is also illustrated in FIG. 10.

The wrap feeding means W is comprised of feed element 160 and biasing element 162. Feed element 160 is preferably comprised of a semi-flexible material with a plurality of flexible fingers 160a extending rearwardly, the whole element having a textured surface. As best illustrated in FIG. 11, feed element 160 is attached by bar 161 to the moveable frame portion 132. In the preferred embodiment, biasing means 162 is an idler roller pivotally attached by arms 164 at pivot pins 166 to movable frame 132, as is also illustrated in FIGS. 9 and 11. The weight of the roller 162 forces it against the feed element 160, trapping wrapping material F between the roller 162 and the feed element 160, illustrated in FIG. 4. Pull of the material, however, in a slightly upward direction will raise roller 162, overcoming its downward biasing or gripping force against feed element 160, as illustrated in FIG. 7.

Extending and Retracting Film Guidance System

The moveable frame 132 which can extend toward the bale and be retracted again, by virtue of movements of the piston arm 152, carries attached to it, in the preferred embodiment, two rollers, 133 and 135 (FIGS. 4, 5, 7 and 8), for the guidance of the wrap F towards the bale. Both rollers are preferably unidirectional idler rollers. As illustrated in FIG. 4 and 7, the film is wound over and under roller 133 and then around roller 135 prior to passing under the biasing roller 162 and over feed element 160. As illustrated in FIGS. 5 and 8, the central portion of roller 133 preferably contains a pad of knurled surface or textured substance 137, such as a sleeve comprised of flexible PVC plastic hose, centered on the roller. Such adhering substance 137 on roller 133, together with the unidirectional nature of rollers 133 and 135, aids in preventing backlash of the wrap F when it is severed.

The Shield

As is best illustrated in FIGS. 9 and 10, shield 136 is affixed to portion 134 of upper frame 102 by hinge 138. Shield 136 rotates upward to permit an easy initial threading of wrap through the dispensing system. Shield 136 is lowered during operation to protect portions of the film dispensing system from dust, wind and debris.

Means for Gathering the Width of the Material

In the preferred embodiment, the means for gathering the width of the material F is combined with a dispensing system that tends, when not inhibited, to dispense material at its nominal width. The means for gathering the material is attached to the upper film guidance system frame 102.

As can be seen from FIGS. 5, 8, and 9, roping arms 140 narrow the width of material F dispensed to the bale. They are attached to section 106 of the upper frame 102. The arms are situated on each side of the material F while it is dispensed from roll 112 and at a location in the path of movement of the material F before it is applied to the bale. More particularly, the means for gathering the width of the material is situated between idler roller 130 and idler rollers 133 and 135 that aid in the guidance of the film as it is dispensed.

Figure 12:
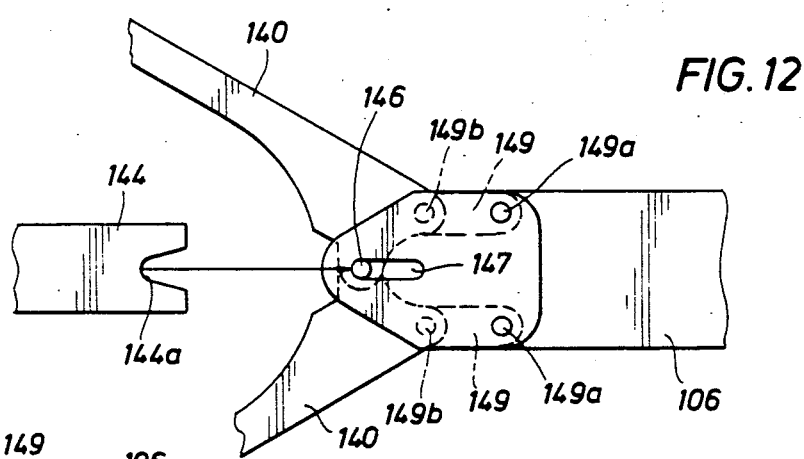
FIG. 12 is a plan view of the mechanism that moves the roping arms, showing the arms in open position.
Figure 14:
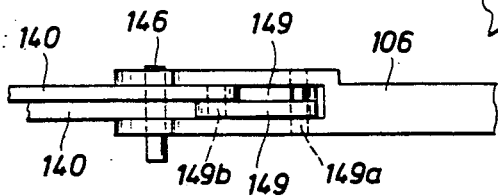
FIG. 14 is a side view of the mechanism that moves the roping arms.
Figure 13:
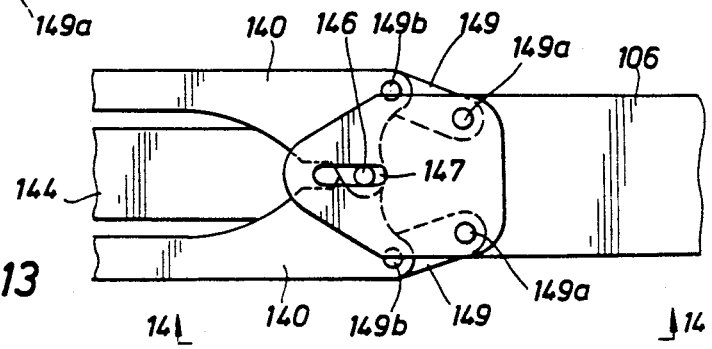
FIG. 13 is a plan view of the mechanism that moves the roping arms, showing the arms in closed position.

The operation of the means for gathering the width of the material can be more particularly viewed by a comparison of FIGS. 5 and 8 and by FIGS. 12, 13 and 14. FIG. 5 illustrates material F dispensed at the nominal width of the material roll. Between idler roller 130 and idler roller 133, the material F passes over roping arms 140 and between actuator projections 142 extending upwardly from the end of the roping arms 140. In FIG. 5 the roping arms are in their open or widest position.

In one embodiment of the invention, as illustrated in FIG. 5, even in the widest position, the roping arms 140 and projections 142 slightly turn under the side edges of the material F. In this embodiment, the material is not dispensed literally at its full width. Nonetheless, material with only its edges slightly turned under will be referred to herein as material F at its nominal width.

Wrapping a bale with material whose side edges are slightly turned under is believed to enhance the tear resistance and protective capacity of the film F, depending to some extent on the thickness and type of plastic film or other material used for the wrap F.

In the preferred embodiment of the present invention, when it is desired to gather the width of material F dispensed to the bale to a narrow configuration, linear actuator 150 retracts the piston arm 152 by electric actuation from the extended position of FIG. 5 to the retracted position of FIG. 8. As arm 152 retracts, notched bar 144 with notch 144a is carried by moveable frame portion 132 toward pin 146 located in slot 147 which is attached to section 106 of upper frame 102. With the retraction of arm 152, bar 144 pushes pin 146 from the pin's extended position to the pin's retracted position, best seen in FIGS. 12 and 13. FIGS. 5 and 12 illustrate pin 146 in its extended position. FIGS. 8 and 13 illustrate pin 146 pushed to its retracted position by the engagement of the notch 144a with pin 146. Viewing FIGS. 12 and 13, it can be seen that as pin 146 is pushed to its retracted position, the movement of mechanical connectors 149, pivoting from frame section 106 at points 149a and from arms 140 at points 149b, cause arms 140 to move toward each other, thereby gathering material F between the arm projections 152 into a narrow rope-like configuration or strand. When the linear actuator arm 152 again extends, notched bar 144 is released from pin 146. Arms 140 are biased to an open position by springs 143, moving mechanical connectors 149 and biasing pin 146 to its extended position. Thus, when notched bar 144 is withdrawn, pin 146 returns to its extended position and arms 140 return to their open position.

Payout Roller and Traversing Systems

As best illustrated in FIGS. 5, 6, 7, 8 and 9, payout roller 180 and traversing mechanism 190 are installed on shaft 58 independently of lower frame 80 and upper frame 102. The payout roller and traversing mechanism are connected to the lower frame by a quick connect coupling, described below. Shaft 58 is mounted by sleeves 70 to mounting brackets 72.

The payout roller 180 preferably connects to the lower frame unit by means of quick connect coupling elements 184 and 186. FIG. 9 illustrates quick connect elements 184 and 186 in their disconnected configuration. FIGS. 4, 5, 6, 7 and 8 illustrate quick connect elements 184 and 186 in their connected configuration. Element 184 is attached to bearing ring 181 which encircles flange 185 of the payout roller. By virtue of bearing ring 181, quick connect element 184 traverses shaft 58 with, but does not rotate with, flange 185 of the payout roller. The inner portion 181a of the bearing ring 181 rotates with flange 185 while the outer portion of the bearing ring and the quick connect element 184 do not rotate.

Quick connect element 186 pivots from lower frame 80 at point 186a, FIG. 9. Quick connect element 184 pivots around flange 185 by means of bearing ring 181. To couple the lower frame with the payout roller system, quick connect means 184 is inserted into quick connect means 186 while cap 184a is extended. When the cap is released a stable coupling is secured in a manner known to the art. Extending cap 184a permits elements 184 and 186 to quickly uncouple and separate by pivoting away from each other.

Payout roller 180 is installed on shaft 58 by means of its own multidirectional bearings 68, as discussed above and illustrated in FIG. 6. A commercially available reversible traversing mechanism 190, such as a Uhing Rolling Ring Drive Unit, is installed on shaft 58 and connected to payout roller 180 by means of traverse control arm 192 and bracket 193. When payout roller 180 rotates on shaft 58, control arm 192 and bracket 193 rotate, thereby rotating traversing mechanism 190. As traversing mechanism 190 rotates upon shaft 58, the mechanism traverses laterally across shaft 58 in a manner known in the art, pulling with it not only the payout roller but also the lower and upper frames by virtue of the coupling means 184 and 186, discussed above. The direction of traverse is determined by rod 192 with its stops 196 and 194. When rod 192 and stop 194 are extended in one direction (e.g. "down" in FIG. 5) traversing mechanism 190 traverses shaft 58 in one direction. When stop 194 contacts pate 71 attached to mounting frame 72, bar 192 is pushed in the other direction (e.g. "up" in FIG. 5). When bar 92 is pushed to its other direction, traversing mechanism 190 traverses shaft 58 in the other direction. When stop 196 contacts plate 73 attached to mounting frame 72, stop 196 is pushed back to the first direction and traversing mechanism 190 traverses shaft 58 back in its first direction. Variable control 198 permits an operator to vary the rate of traverse.

Adhering pads 182, preferably comprised of a substance such as a cotton polyester blended belting having a pebbled, textured Nytril surface covering, form part of the surface of payout roller 180. The adhering pads keep film F from slipping across the payout roller. Hence, as film F from roll 112 is pulled across and over payout roller 180 and adhering pads 182, by the rotation of the bale in the bale chamber, payout roller 180 rotates. Variable resistance means 183, shown on FIGS. 5, 6 and 8, is a simple braking device comprised of brake shoe 183a that is pressed against flange 185 by spring 183b, the pressure being adjusted by screw 183c. Variable resistance means 183 is attached to the exterior of bearing ring 181. The variable braking device operates to vary the resistance of payout roller 180 to rotation, enabling the operator to vary the longitudinal tension under which the wrap is maintained as it is dispensed.

Remote Control Means

Dispensing linear actuator 150 and severing linear actuator 92 are connected by wires to power plugs 81 and 83 (FIGS. 5 and 8) affixed to upper frame 102. The power plugs receive their power via electrical connection to the power take off of the tractor, not shown, but well known in the art. By virtue of these electrical connections, the operator in the cab can remotely control the attaching means, the dispensing means and the severing means. Hence, the total operation is remotely controllable by the operator in the cab of the tractor.

Method of Practicing Preferred Embodiments

The preferred embodiment of the invention is practiced in the following manner. It is assumed that the apparatus is properly installed on the forward portion of a commercial baler. It is further assumed that the bale is to be wrapped with a roll of plastic stretch film or other adhering material F of less width than the bale.

The roll 112 of protective material F is loaded onto mandrel 116 between flanges 114. Mandrel 116 is placed within brackets 128. The mandrel is locked into place by means of bars 120. Bars 120 are locked by moving knobs 122 into slots 124.

For the convenience and safety of the operator, upper film guidance system frame 102 is disconnected from lower frame 80 by removing the quick release toggle pins 85 on posts 84. The upper film guidance system is paced nearby in the forward portion of the baler. An end of film F is pulled from roll 112, gathered into a strand and wrapped forward and around payout roller 180. The gathered end is then carried to the upper film guidance system and fed over idler roller 130, between roping arms 140 (which are biased to their closed position, as seen in FIG. 8), over idler roller 133, down and around idler roller 135 and out under biasing roller 162 and over feed element 160. The weight of biasing roller 162 holds the end of the material against feed element 160. Upper frame 102 is now inserted into lower frame 80, as described above, and is snapped into place by means of fitting the quick release toggle pins 85 through the posts 84.

Upon the completion of the formation of a bale inside the bale chamber, the operator of the tractor may discontinue picking up fresh crop material, and even back up. Initiation of the contacting and attaching process is preferably commenced by remote control from the cab. Arm 152 of the dispensing linear actuator extends the mobile portion of the dispensing frame with the feeding element through the baler throat 24 to the crop intake opening 20 of the bale chamber until the end of the wrap, engaged upon the feed fingers 160a, makes contact with the bale. The roping arms 140 assume their open position as arm 152 is extended but, because no wrap is being pulled from the roll, the wrap remains in a gathered configuration.

Rotation of the formed bale in the chamber, controlled by the driver of the tractor in a known manner, causes the end of the wrap to adhere to the surface of the bale and to lift off of feed fingers 160 and to be pulled onto the exterior of the bale. (Arm 164 swings upward around pivoting point 166 and biasing roller 162 rises upward, freeing the film from engagement with the feed element 160.)

As the bale is turned, film is pulled from roll 112, through the dispensing system of the apparatus and around the exterior of the bale. As the material F begins to be pulled around the bale, linear actuator 152 retracts somewhat from its fully extended position to remove the dispensing idler rollers 133 and 135 from close proximity to the crop intake opening of the bale forming chamber and from the rotating bale. Dispensing linear actuator arm 152, however, remains extended to the extent that roping arms 140 remain in their open position, as illustrated in FIG. 5. Material is quickly dispensed to the bale at its nominal width (or with the side edges slightly turned under). Although the material was originally attached in a narrow strand, when the roping arms are open the material F quickly spreads to its nominal width as it is pulled off of the roll 112 and through the dispensing system. A slight stretching of the film preferably occurs during such wrapping operation.

As the material is pulled over payout roller 180, the payout roller and traversing mechanism 190 rotate upon shaft 58. The rotation of traversing mechanism 190, together with the operation of bar 192 and adjustment 198, as described above, causes the payout roller to traverse shaft 58 from left to right and back again at an established rate. The connection established between coupling elements 186 and 184 causes lower frame 80 and upper frame 102 to traverse in tandem with the payout roller. The bale is covered in spiral fashion with material F opened to its nominal width.

The term "hay" as used in the claims is intended to refer to hay or the like, any crop material. When the bale has been sufficiently wrapped, the operator retracts linear actuator arm 152, thereby closing roping arms 140 and gathering material F into a narrow strand or rope-like configuration. The operator continues to wrap the bale spirally with a narrow strand. This final wrap enhances the binding and compressing qualities of the wrap. In addition it tends to insure that the lower covering layer of the material remains in place.

Upon the completion of the wrap with a rope-like strand, the operator initiates the severing mechanism. Severing linear actuator arm 93 extends, rotating upward hinge element 96 and outer arm 98. The cutting teeth 99a intersect the path of the material between biasing roller 162 and the bale. The teeth 99a sever the film F by perforating the film F, resulting in tearing it due to the pulling of the film F by the rotation of the bale. As teeth 99a retract they pass adjacent feed fingers 160a. The end of the film F, attached to teeth 99a, becomes transferred and attached to the feed element 160 as teeth 99a retract. By virtue of its weight, biasing roller 162 pivots downward with the retraction of teeth 99a, trapping the severed end of the material between the biasing roller and the feed element. The end of the material is thus in position to be attached to the next bale.

Although the invention has been disclosed in use with round hay balers, it should be understood that the invention should be used with balers for other agricultural products or for products that are baled in other than a "round" (i.e. cylindrical) shape. Furthermore, the actuation of the gathering means and the severing means could be automatic such that they do not require operator initiation.

It is to be understood that the foregoing disclosure and description of the invention are illustrative and explanatory thereof, and various Changes in the size, shape and materials, as well as in the details of the illustrative construction may be made without departing from the spirit of the invention.

We claim:

1. Apparatus adapted to be mounted with a baler for wrapping a bale of hay with adhering protective material while the bale rotates within a bale forming chamber, the apparatus comprising:
   (a) means for attaching an end of the material to the rotating bale at the crop intake opening of the bale forming chamber such that the material adheres to the rotating bale in the chamber, including a feed arm adapted to engage an end portion of the material, to oscillate between an extended position in proximity to the bale at the crop intake opening of the bale forming chamber and a retracted position, and to thrust the end portion of the material into contact with the bale when in said extended position;
   (b) a roll means for rotatably supporting a roll of protective material, so that as the bale rotates, the end of the material in contact with the bale is pulled around the bale to at least partially cover the bale with the protective material; and (c) means for severing the protective material that is wrapped around the bale from the protective material extending from the roll.

2. The apparatus of claim 1 wherein the feed arm includes a feed element comprised of a plurality of flexible fingers having a textured surface for engagement with the material.

3. The apparatus of claim 1 wherein the means for attaching is further comprised of a means for biasing the end of the material against the feed arm.

4. The apparatus of claim 3 wherein the means for biasing is comprised of a roller that is pivotally attached to the feed arm such that the roller pivots to and away from the feed arm and such that the roller's weight pivots the roller against the feed arm.

5. The apparatus of claim 1 wherein the severing means is mounted to oscillate from a severing position to an inactive position and wherein the severing means moves relative to the feed arm such that, subsequent to being severed, the end portion of the material leading from the roll engages the feed arm.

6. The apparatus of claim 1 that further comprises means for removably mounting the apparatus in a forward section of the baler wherein the attaching means is mounted on the baler such that the feed arm moves approximately horizontally through the baler throat to the crop intake opening of the bale forming chamber to thrust the end of the material into contact with the bale.

7. The apparatus of claim 1 wherein the attaching means and the severing means are remotely controllable.

8. The apparatus of claim 1 wherein the protective material is plastic stretch film.

9. The apparatus of claim 1 wherein the protective material is stretch netting.

10. The apparatus of claim 1 where the attaching means is mounted on the baler such that the feed element moves approximately horizontally through the baler throat to the crop intake opening the bale forming chamber to thrust the end of the material into contact with the bale.

11. Apparatus adapted to be mounted with a baler for wrapping a bale of hay with protective material while the bale rotates within a bale forming chamber, the apparatus comprising:
(a) means for contacting an end of the material with the bale;
(b) means for dispensing protective material from a roll mounted on the apparatus to the exterior of the bale as the bale rotates in the chamber wherein the roll of material has a width which is less than the bale, the dispensing means including a traversing means for causing the pull of the material around the bale to make the roll and the dispensing means traverse the width of the bale while the axis of rotation of the roll remains parallel with and equidistant from the axis of rotation of the bale; and
(c) means for severing the portion of the wrap that is around the bale from the portion of the wrap leading from the roll.

12. The apparatus of claim 11 wherein the roll traverses a roll shaft mounted upon the baler, the roll shaft being aligned approximately parael to the axis of rotation of the bale.

13. The apparatus of claim 11 wherein the traversing means traverses a payout shaft mounted upon the baler, the payout shaft being aligned approximately parallel to the axis of rotation of the bale.

14. The apparatus of claim 13 wherein the traversing means includes a payout roller mounted on the payout shaft over which the material passes intermediate the roll and the bale, and wherein the pull of the material causes the payout roller to rotate and traverse the payout shaft.

15. The apparatus of claim 14 wherein the traversing means includes a traversing element attached to the payout roller and wherein the traversing element rotates and traverses with the payout roller and controls the direction and rate of traverse of the roll and dispensing means.

16. The apparatus of claim 14 wherein the payout roller includes adhering pads that inhibit the sliding of the material over the payout roller surface as the material is pulled onto the bale.

17. The apparatus of claim 14 wherein the traversing means further comprises means for varying the resistance of the payout roller to rotation upon the payout shaft such that the longitudinal tension on the material between the bale and the payout roller can be varied.

18. The apparatus of claim 15 wherein the traversing element automatically reverses the direction of traverse when the payout roller has traversed the width of the bale.

19. The apparatus of claim 11 wherein the traversing means causes the attaching means and the severing means to traverse the width of the bale.

20. The apparatus of claim 11 wherein the attaching means, the dispensing means and the severing means are remotely controllable.

21. The apparatus of claim 11 wherein the protective material is plastic stretch film.

22. The apparatus of claim 11 wherein the protective material is stretch netting.

23. Apparatus adapted to be mounted with a baler for wrapping a bale of hay with protective material while the bale rotates within a bale forming chamber, the apparatus comprising:
(a) means attached to the apparatus for attaching an end of the material to the rotating bale including a feed arm that extends and retracts and means for extending and retracting said feed arm;
(b) means attached to the apparatus for dispensing protective material from a roll mounted on the apparatus to the exterior of the bale as the bale rotates within the chamber wherein the means for dispensing include arms intermediate the roll and the bale for gathering the width of the material dispensed to the bale into a rope-like strand, means for operatively connecting the gathering arms to the means for extending and retracting the feed arm such that the extending/retracting means moves the gathering arms to gather the material; and
(c) means for serving the portion of the material that is around the bale from the portion of the material leading from the roll.

24. The apparatus of claim 23 wherein the dispensing means dispenses material at the nominal width of the roll when the gathering means does not gather the width of the material.

25. The apparatus of claim 24 wherein the severing means severs the material intermediate the bale and the gathering means and wherein the means for severing further comprises means for severing material that is gathered into a narrow configuration.

26. The apparatus of claim 25 wherein the means for severing comprises a plurality of teeth.

27. The apparatus of claim 24 wherein the means for attaching further comprises means for attaching an end of material that has been gathered into a narrow configuration.

28. The apparatus of claim 24 wherein the roll of material is of less width than the bale and wherein the means for dispensing further includes traversing means for causing the roll and the dispensing means to traverse the width of the bale as the rotation of the bale pulls the material around the bale.

29. The apparatus of claim 23, wherein the attaching means, the dispensing means and the severing means are remotely controllable.

30. The apparatus of claim 23 wherein the protective material is plastic stretch film.

31. The apparatus of claim 23 wherein the protective material is stretch netting.

32. A method for wrapping a bale of hay with adhering protective material comprising the steps of:
 (a) forming a bale of hay in a bale chamber of a baler apparatus;
 (b) attaching a portion of an end of the protective material to; a feed arm located in a retracted position;
 (c) oscillating the feed arm to an extended position such that the end of the protective material is thrust to the crop intake opening of the bale chamber and against a bale within the chamber;
 (c) rotating the bale in the bale chamber such that the end of the material thrust against the bale attaches to the bale and the rotation of the bale pulls the material from the roll and around the exterior of the bale to at least partially cover same; and
 (e) severing the protective material that is wrapped around the bale from the protective material leading from the roll.

33. The method of claim 32 that further comprises gathering the end of material into a narrow configuration in engagement upon the feed arm prior to thrusting the end against the bale.

34. A method for wrapping a bale of hay with protective material from a roll of material of less width than the bale, the method comprising the steps of:
 (a) forming a bale of hay in a bale chamber of a baler apparatus;
 (b) affixing a roll of material to the baler such that the axis of rotation of the roll parallels the axis of rotation of the bale;
 (c) attaching an end of protective material from the roll of the bale;
 (d) rotating the bale in the chamber such that the rotation pulls the attached material from the roll around the exterior of the bale;
 (e) causing the roll of material to traverse the width of the bale by the pulling of the material from the roll such that the material at least partly covers the bale while the axis of rotation of the roll remains parallel with and equidistant from the axis of rotation of the bale;
 (f) severing the portion of the material that is around the bale from the portion of the material leading from the roll.

35. The method of claim 34 which further comprises passing the material over a payout roller intermediate the roll and the bale.

36. The method of claim 35 wherein the pulling of the material around the bale causes the payout roller and the roll of material to traverse shafts, the shafts being affixed to the baler and aligned approximately parallel to the axis of rotation of the bale.

37. The method of claim 36 which further comprises surfacing the payout roller with adhering pads to inhibit the sliding of the material over the payout roller as the material is pulled.

38. A method for wrapping a bale of hay with a protective material comprising the steps of:
 (a) forming a bale of hay or the like in the bale chamber of a baler apparatus;
 (b) extending a feed arm by an extending means to attach an end of the material from a roll to the bale;
 (c) rotating the bale in the chamber such that the rotation of the bale pulls the material from the roll around the exterior of the bale;
 (d) moving gathering arms by the operation of the extending means to gather, for at least a portion of the time, the width of the material that is dispensed to the bale into a rope-like strand; and
 (e) severing the portion of the material that is around the bale from the portion of the material leading from the roll.

39. The method of claim 38 wherein the material is dispensed to the bale at the nominal width of the material when the width of the material is not gathered.

40. The method of claim 39 wherein the severing includes severing a portion of the material whose width has been gathered to a narrow configuration.

41. The method of claim 39 wherein the attaching includes attaching an end of the material whose width has been gathered to a narrow configuration.

42. The method of claim 39 that further comprises employing a roll of protective material that is of less width than the bale and causing the roll to traverse the width of the bale by the pull of the material around the bale.

43. The method of claim 42 wherein the attaching includes attaching to the bale an end of the material whose width has been gathered to a narrow configuration; and wherein the bale is wrapped with material at the nominal width of the material while the roll traverses the width of the bale to at least partially cover same; and wherein the bale is wrapped with material gathered to a narrow configuration while the roll traverses the width of the bale; and wherein the severing includes severing a portion of the material that has been gathered to a narrow configuration.

* * * * *

UNITED STATES PATENT AND TRADEMARK OFFICE
CERTIFICATE OF CORRECTION

PATENT NO. : 5,079,898

DATED : January 14, 1992

INVENTOR(S) : Springs et al.

It is certified that error appears in the above-identified patent and that said Letters Patent is hereby corrected as shown below:

At column 1, line 34, change "handing" to --handling--.
At column 1, line 68, insert --.-- after "features".
At column 2, line 7, insert --.-- after "compressing".
At column 3, line 57, after "freed," change "wi" to --will--.
At column 4, line 16, change "Sohulz's" to --Schulz's--.
At column 5, line 47, insert --.-- after "strand".
At column 7, line 3, insert --.-- after "ejected".
At column 7, line 28, change "attachment" to --attaching--.
At column 11, line 27, change "152" to --142--.
At column 12, line 19, change "pate" to --plate--.
At column 14, line 18, change "outer" to --cutter--.
At column 14, line 24, change "fi]m" to --film--.
At column 14, line 34, change "should" to --could--.
At column 14, line 42, change "Changes" to --changes--.
At column 15, (claim 12) line 63, change "parael" to --parallel--.
At column 16, (claim 23) line 57, change "severing" to --serving--.
At column 17, (claim 32) line 25, change "material to;" to --material to--.

Signed and Sealed this

Twenty-eighth Day of September, 1993

Attest:

Attesting Officer

BRUCE LEHMAN

Commissioner of Patents and Trademarks